US012045057B2

(12) United States Patent
Liu et al.

(10) Patent No.: US 12,045,057 B2
(45) Date of Patent: Jul. 23, 2024

(54) TURNING CONTROL METHOD FOR CONSTRUCTION MACHINE, CONSTRUCTION MACHINE AND COMPUTER DEVICE

(71) Applicant: Hunan Sany Zhongyi Machinery Co., Ltd., Yiyang (CN)

(72) Inventors: Jian Liu, Yiyang (CN); Gan Jia, Yiyang (CN); Bin Du, Yiyang (CN)

(73) Assignee: Hunan Sany Zhongyi Machinery Co., Ltd., Yiyang (CN)

( * ) Notice: Subject to any disclaimer, the term of this patent is extended or adjusted under 35 U.S.C. 154(b) by 394 days.

(21) Appl. No.: 17/584,700

(22) Filed: Jan. 26, 2022

(65) Prior Publication Data

US 2022/0147047 A1   May 12, 2022

Related U.S. Application Data

(63) Continuation of application No. PCT/CN2021/100934, filed on Jun. 18, 2021.

(30) Foreign Application Priority Data

Jun. 19, 2020   (CN) .......................... 202010564714.0

(51) Int. Cl.
  *G05D 1/00* (2024.01)
  *B62D 6/00* (2006.01)
  *E01C 19/26* (2006.01)
(52) U.S. Cl.
  CPC .......... *G05D 1/0212* (2013.01); *B62D 6/001* (2013.01); *E01C 19/26* (2013.01); *G05D 1/0088* (2013.01)

(58) Field of Classification Search
  CPC .......... B60W 30/045; B60W 60/0025; B60W 2300/17; E01C 19/26; E01C 19/262; G05D 1/0088; G05D 1/0212; G05D 1/0223
  See application file for complete search history.

(56) References Cited

U.S. PATENT DOCUMENTS 11,500,390 B2 * 11/2022 Kakkar ................ G05D 1/0219
2016/0334804 A1   11/2016 Webber et al.
(Continued)

FOREIGN PATENT DOCUMENTS

CN   104627175 A   5/2015
CN   107447621 A   12/2017
(Continued)

OTHER PUBLICATIONS

English Machine Translation of CN 109471441A, Retrieved Apr. 15, 2024.*
(Continued)

*Primary Examiner* — Jason Holloway
*Assistant Examiner* — Blake A Wood
(74) *Attorney, Agent, or Firm* — Westbridge IP LLC

(57) ABSTRACT

In the present disclosure, a turning control method for a construction machine, a construction machine and a computer device are provided. The turning control method includes: acquiring position information of an initial position and a target position as well as kinematic parameters of the construction machine; determining a turning curve according to the position information and the kinematic parameters; and controlling the construction machine to travel from the initial position to the target position according to the turning curve, wherein a portion of the turning curve in which curvature thereof varies is a transition curve. In this way, the construction machine can achieve continu- (Continued)

ous changing in curvature during turning, without a spot-turning phenomenon.

14 Claims, 11 Drawing Sheets

(56) References Cited

U.S. PATENT DOCUMENTS

| | | | | |
|---|---|---|---|---|
| 2017/0144702 A1* | 5/2017 | Dang | ..................... | B62D 6/001 |
| 2017/0202131 A1* | 7/2017 | Bunderson | ............ | B60W 10/04 |
| 2018/0310461 A1* | 11/2018 | Shinkai | ................ | A01B 69/001 |
| 2019/0227561 A1* | 7/2019 | Hiramatsu | ........... | A01B 69/008 |

FOREIGN PATENT DOCUMENTS

| | | |
|---|---|---|
| CN | 109471441 A | 3/2019 |
| CN | 109857097 A | 6/2019 |
| CN | 110440824 A | 11/2019 |
| CN | 110789523 A | 2/2020 |
| CN | 111071247 A | 4/2020 |
| CN | 111764235 A | 10/2020 |
| JP | 2003328316 A | 11/2003 |
| JP | 2020027459 A | 2/2020 |
| WO | 2020069769 A1 | 4/2020 |

OTHER PUBLICATIONS

First Office Action issued in counterpart Chinese Patent Application No. 202010564714.0, dated Jun. 16, 2021.
International Search Report issued in corresponding PCT Application No. PCT/CN2021/100934, dated Sep. 3, 2021.

* cited by examiner $\beta \in (\pi - 2\alpha, \beta_1]$ $\beta \in (\beta_1, \pi]$

TURNING CONTROL METHOD FOR CONSTRUCTION MACHINE, CONSTRUCTION MACHINE AND COMPUTER DEVICE

CROSS-REFERENCE TO RELATED APPLICATIONS

This application is a continuation of International Application No. PCT/CN2021/100934 filed on Jun. 18, 2021, which claims priority to Chinese Patent Application No. 202010564714.0 filed on Jun. 19, 2020. The disclosures of the above-mentioned applications are hereby incorporated by reference in their entireties.

TECHNICAL FIELD

The present disclosure relates to a technical field of turning control, and specifically to a turning control method for a construction machine, a construction machine and a computer device.

BACKGROUND

Currently, during construction, it is often necessary for a construction machine to perform operations, such as turning, making a U-turn and changing a lane, in a local region, and it is high in operation frequency, requiring many repetitive operations. Some construction machines are equipped with an automatic turning system to realize automatic control of turning, instead of manual control of turning, thus reducing repetitive operations and improving operation efficiency. However, for some construction machines, especially for road construction machines, in order to avoid damage to road surfaces under construction, it is forbidden to perform spot-point turning. Regarding prior automatic turning systems and automatic turning methods, the phenomenon of spot-point turning occurs, which will affect operation quality and precision of road surfaces under construction, and is not in conformity with the requirement for road construction. Moreover, prior automatic turning systems and automatic turning methods have a relatively large deviation, not suitable for turning operations with high precision requirement, and the arranged path cases are relatively simple, narrow in application range.

SUMMARY

In view of this, the present disclosure provides a turning control method for a construction machine, a turning control device for a construction machine, a construction machine and a computer device.

In a first aspect, the present disclosure provides a turning control method for a construction machine. The turning control method includes: acquiring position information of an initial position and a target position as well as kinematic parameters of the construction machine; determining a turning curve according to the position information and the kinematic parameters; and controlling the construction machine to travel from the initial position to the target position according to the turning curve, wherein the kinematic parameters include a minimum turning radius of the construction machine, a turning travel speed of the construction machine, and a switching time period for the construction machine to switch from a state of traveling straight to a state of turning with the minimum turning radius; and a portion of the turning curve in which curvature thereof varies is a transition curve.

According to the technical solution(s) of the first aspect of the present disclosure, it is to acquire position information of an initial position and a target position of the construction machine to determine positions of starting and ending points during turning, and it is to acquire kinematic parameters of the construction machine (including a minimum turning radius of the construction machine, a turning travel speed of the construction machine, and a switching time period for the construction machine to switch from a state of traveling straight to a state of turning with the minimum turning radius) to determine a turning curve in the subsequent step(s). It is possible to determine a turning curve during turning by mathematical calculation, according to the position information of the starting and ending positions and the kinematic parameters, wherein a portion of the turning curve in which curvature thereof varies is a transition curve (a curve provided between a straight line and a circular curve or between a circular curve and another circular curve, with its curvature changing continuously), to ensure that the turning curve does not include any point with sudden change in curvature. It is to control the construction machine to travel from the initial position to the target position according to the turning curve such that the construction machine can achieve continuous changing in curvature during the whole turning, without a spot-turning phenomenon, especially for road construction machines such as a road roller. Therefore, it will not cause damage to road surfaces under construction, facilitating controlling quality and construction precision of road surfaces under construction and reducing error during turning. Also, the turning control method for a construction machine in the present solution is suitable for turning operations during approaching, transferring, lane changing, position adjusting, and the like, with a wide range of applications.

It should be noted that according to difference in the initial position and the target position, in addition to the transition curve, the turning curve also includes a portion with constant curvature, such as a straight line or a circular arc.

It can be understood that during construction of a road construction machine, such as a road roller, the construction object is the road surface after paving which has not been completely solidified. If the road roller performs a spot-turning operation, the road surface will be deformed by the effect of friction force of the vehicle wheels, affecting construction operation quality. In the present solution, the turning control method for a construction machine can effectively alleviate the above problem.

In combination with the first aspect, in some embodiments, the determining a turning curve according to the position information and the kinematic parameters includes: determining a first angle and a first distance between the target position and an extension line of the initial position according the position information; generating a curve model according to the minimum turning radius, the turning travel speed and the switching time period; determining a curve type of the turning curve according to the first distance; and determining the turning curve according to the first angle, the curve type and the curve model, wherein the first angle is a supplementary angle to a turning angle of the construction machine, the curve type is determined from various types according to whether it is necessary for the construction machine to travel straight, and the curve model is used for calculating the turning curve for the construction machine to travel from the initial position to the target position.

In the technical solution, it is to determine a first angle as well as a first distance between the target position and an extension line of the initial position according the position information of the initial position and the target position, as the calculation basis for subsequent determination of the turning curve, wherein the first angle is a supplementary angle to a turning angle for the construction machine to turn from the initial position to the target position. It is to generate a curve model for calculating the turning curve according to the kinematic parameters (i.e. the minimum turning radius, the turning travel speed and the switching time period) of the construction machine, the curve model is used for calculating the turning curve from the initial position to the target position. Specifically, the turning curve includes two transition curves and two circular arcs, wherein the initial position and the target position are located at the starting point and the ending point of the two transition curves, respectively. The two circular arcs are connected with the two transition curves, and the two transition curves and the two circular arcs are axisymmetrical with respect to an angle bisector of the first angle. Thus, the following geometrical relation can be obtained: $2\alpha+2\gamma=\pi-\beta$, and $\alpha=L/(2R)$; and the transition curve is defined based on the equations: $r \times l = R \times L$, and $L = V \times t$. Herein, $\alpha$ is a turning angle (i.e. tangential deviation angle) of the transition curve; $\gamma$ is a turning angle from a connection point between the transition curve and the circular arc to an angle bisector of the first angle; $\beta$ is the first angle, and $\pi-\beta$ is the turning angle of the whole turning curve; $r$ is an instantaneous turning radius, $l$ is a length of a transition curve corresponding to the instantaneous turning radius, $R$ is the minimum turning radius, $L$ is the length of the transition curve, $V$ is the turning travel speed, and $t$ is the switching time period. The curve type of the turning curve is determined from various types according to whether it is necessary for the construction machine to travel straight, and the calculation process for the turning curve is different for each type. Specifically, it is possible to determine a curve type of the turning curve according to the value of the first distance. Finally, it is possible to calculate a curve equation of the turning curve according to the first angle, the curve type and the curve model, i.e. determining the turning curve.

In combination with the first aspect, in some embodiments, the determining a curve type of the turning curve according to the first distance includes: judging whether the first distance is less than or equal to a distance threshold and generating a first judgment result; if the first judgment result is yes, determining that the curve type is a first type; and if the first judgment result is no, determining that the curve type is a second type, wherein in a case that the curve type is the first type, the turning curve is used for controlling the construction machine to achieve traveling from the initial position to the target position by turning, and in a case that the curve type is the second type, the turning curve is used for controlling the construction machine to achieve traveling from the initial position to the target position by multiple times of turning and traveling straight.

In the technical solution, according to whether it is necessary for the construction machine to travel straight, the curve type of the turning curve is determined from two types: a first type and a second type. With the turning curve of the first type, it is possible to travel from the initial position to the target position directly by turning, without traveling straight. The turning curve of the second type includes multiple turnings and one straight line. It is to judge whether the first distance is less than or equal to a distance threshold so as to determine the curve type of the turning curve, and to generate a first judgment result. If the first judgment result is yes, it means that the initial position is relatively close from the target position, thus determining that the curve type is a first type; otherwise it means that the initial position is relatively far from the target position, thus determining that the curve type is a second type. It can be understood that in a case that the turning curve is the second type and the turning angle is sufficiently large, it is also possible for the construction machine to directly turn from the initial position to the target position. However, it is not easy to achieve such operation during practical construction due to a relatively long path and a relatively large space needed. Instead, the turning is thus achieved in a relatively small range by multiple times of turning and traveling straight.

In combination with the first aspect, in some embodiments, in a case that the curve type is the first type, the determining the turning curve according to the first angle, the curve type and the curve model includes: determining an angle range where the first angle is located; if 0°<the first angle≤a first angle threshold, determining a transition point according to the first angle, and determining the turning curve according to the transition point, the initial position, the target position and the curve model; if the first angle threshold<the first angle≤a second angle threshold, determining the turning curve according to the curve model; if the second angle threshold<the first angle≤a third angle threshold, determining the turning curve according to the curve model after angle transformation; and if the third angle threshold<the first angle≤180°, determining a backward turning angle according to the first angle and the first distance, and determining the turning curve according to the backward turning angle and the curve model, wherein the first angle threshold and the third angle threshold are preset values, the second angle threshold is two times of a complementary angle to a tangential deviation angle of the transition curve, the backward turning angle is an angle by which the construction machine travels backward from the initial position and turns until a vehicle axis of the construction machine is coaxial with that of the construction machine at the target position.

In the technical solution, in a case that the curve type is the first type, by determining an angle range of the first angle, calculation methods for different transition curves are determined. It can be understood that the minimum turning radius of the construction machine is a constant value. With the first angle different in value, i.e. with the turning angle different in value, there is a certain difference in the shape of the transition curve and calculation. In the range of (0°, 180°], three thresholds are set: a first angle threshold, a second angle threshold and a third angle threshold, wherein the first angle threshold is less than the second angle threshold, and the second angle threshold is less than the third angle threshold, thus forming four angle ranges. Herein the first angle threshold and the third angle threshold are preset values and are determined according to experiments or operation experience, and the second angle threshold is determined, according to geometrical relation, as two times of a complementary angle to a tangential deviation angle of the transition curve.

If 0°<the first angle≤the first angle threshold, the turning angle is relatively large, and the construction machine can not travel from the initial position to the target position by one turning. In this case, a transition point should be determined according to the first angle, and the construction machine can first turn from the initial position to the transition point and then turn from the transition point to the target position. Specifically, the construction machine can first travel backward and turn by an angle β+2α to the transition point according to the curve model, and then travel forward towards the target position and turn by an angle π−2α to the target position according to the curve model. The path curves during the two turning processes are calculated respectively, thus determining the complete turning curve.

If the first angle threshold<the first angle≤the second angle threshold, it is possible to directly determine the turning curve according to the curve model.

If the second angle threshold<the first angle≤the third angle threshold, it is possible to perform angle transformation for the curve model and determine the turning curve according to $\alpha^{\wedge \prime}=(\pi-\beta)/2=l^{\wedge}2/2C$, wherein $C=R \times L$.

If the third angle threshold<the first angle≤180°, the turning angle is relatively small. In this case, it is necessary for the construction machine to travel backward and turn until the vehicle axis of the construction machine is coaxial with that of the construction machine at the target position, and then to travel straight along the vehicle axis to the target position. According to the value of the first angle, a backward turning angle can be determined, and according to the curve model and the backward turning angle, a curve portion of traveling backward and turning can be determined, and the curve portion can be combined with a straight line portion to determine the complete turning curve.

It should be noted that in a range of (180°, 360°], the method for determining the turning curve is the same as that in (0°, 180°], only different in direction.

In combination with the first aspect, in some embodiments, in a case that the curve type is the second type, the determining the turning curve according to the first angle, the curve type and the curve model includes: determining a first turning point and a second turning point according to the initial position and the target position; determining a connection straight line passing through the first turning point and the second turning point; determining a first turning curve according to the first angle, the initial position, the first turning point and the curve model; determining a second turning curve according to the first angle, the second turning point, the target position and the curve model; and determining the turning curve according to the connection straight line, the first turning curve and the second turning curve, wherein the first turning point is an ending position of a path along which the construction machine turns from the initial position onto the connection straight line, and the second turning point is a starting position of a path along which the construction machine turns from the connection straight line to the target position.

In the technical solution, in a case that the curve type is the second type, the initial position is relatively far from the target position, it is necessary for the construction machine to perform multiple times of turning and traveling straight to reach the target position. Specifically, it is necessary for the construction machine to perform turning for two times and traveling straight between such two turning processes. It is to determine a first turning point (being the ending point of the first turning) and a second turning point (being the starting point of the second turning) according to the initial position and the target position. It is to determine a connection straight line passing through the first and second turning points, to determine a path for traveling straight between the two turnings. A first turning curve of the first turning process can be determined according to the first angle, the initial position, the first turning point and the curve model. Similarly, a second turning curve of the second turning process can be determined according to the first angle, the second turning point, the target position and the curve model. Further, it is possible to connect the first turning curve, the connection straight line and the second turning curve to obtain a complete turning curve from the initial position to the target position. It is understandable that in a case that the turning curve is the second type and the turning angle is sufficiently large, it is also possible for the construction machine to directly turn from the initial position to the target position. However, it is not easy to achieve such operation during practical construction due to a relatively long path and a relatively large space needed. Instead, the turning is thus achieved in a relatively small range by multiple times of turning and traveling straight.

In combination with the first aspect, in some embodiments, the determining a first turning curve according to the first angle, the initial position, the first turning point and the curve model includes: determining a vehicle axis of the construction machine at the initial position as a first straight line; determining a first included angle between the first straight line and the connection straight line; and determining the first turning curve according to the first included angle and the curve model.

In the technical solution, it is possible to determine the orientation of the construction machine when the construction machine is at the initial position according to the initial position, and determine the vehicle axis at this time as a first straight line. By determining an angle (i.e. the first included angle) between the first straight line and the connection straight line, a turning path (i.e. the first turning curve) from the initial position to the first turning point can be determined according to the first included angle and the curve model, such that the first turning curve does not present any phenomenon with sudden change in curvature.

In combination with the first aspect, in some embodiments, the determining a second turning curve according to the first angle, the second turning point, the target position and the curve model includes: determining a vehicle axis of the construction machine at the target position as a second straight line; determining a second included angle between the second straight line and the connection straight line; and determining the second turning curve according to the second included angle and the curve model.

In the technical solution, it is possible to determine the orientation of the construction machine when the construction machine is at the target position according to the target position, and determine the vehicle axis at this time as a second straight line. By determining an angle (i.e. the second included angle) between the second straight line and the connection straight line, a turning path (i.e. the second turning curve) from the second turning point to the target position can be determined according to the second included angle and the curve model, such that the second turning curve does not present any phenomenon with sudden change in curvature.

In combination with the first aspect, in some embodiments, the transition curve is defined based on the following equations: $r \times l = R \times L$; and $L = V \times t$, wherein r is an instantaneous turning radius, l is a length of the transition curve corresponding to the instantaneous turning radius, R is the minimum turning radius, L is a length of the transition curve, V is the turning travel speed, and t is the switching time period.

The transition curve is configured to be in conformity with the equation(s), and it can be ensured that there is no spot-turning during turning of the construction machine.

In combination with the first aspect, in some embodiments, the construction machine is a road construction machine.

In a second aspect, the present disclosure provides a turning control device for a construction machine. The turning control device includes: an acquiring module, configured to acquire position information of an initial position and a target position as well as kinematic parameters of the construction machine; a determining module, configured to determine a turning curve according to the position information and the kinematic parameters; and a controlling module, configured to control the construction machine to travel from the initial position to the target position according to the turning curve, wherein the kinematic parameters include a minimum turning radius of the construction machine, a turning travel speed of the construction machine, and a switching time period for the construction machine to switch from a state of traveling straight to a state of turning with the minimum turning radius; and a portion of the turning curve in which curvature thereof varies is a transition curve.

In a third aspect, the present disclosure provides a construction machine. The construction machine includes: a vehicle body; a detection assembly, connected with the vehicle body, configured to detect position information of the vehicle body; and a controller, provided in the vehicle body, the controller being electrically connected with the vehicle body and the detection assembly to control traveling of the vehicle body according to the position information detected by the detection assembly, wherein the controller is configured to control turning of the vehicle body according to the following steps: acquiring position information of an initial position and a target position as well as kinematic parameters of the construction machine; determining a turning curve according to the position information and the kinematic parameters; and controlling the construction machine to travel from the initial position to the target position according to the turning curve, wherein the kinematic parameters include a minimum turning radius of the construction machine, a turning travel speed of the construction machine, and a switching time period for the construction machine to switch from a state of traveling straight to a state of turning with the minimum turning radius; and a portion of the turning curve in which curvature thereof varies is a transition curve.

According to the technical solution of the third aspect of the present disclosure, the construction machine includes a vehicle body, a detection assembly and a controller. As the main body of the construction machine, the vehicle body is used for carrying various working mechanisms. The detection assembly may be connected with the vehicle body, for detecting position information of the vehicle body, including: the initial position, the ending position, as well as the coordinate information and the angle information of any point on the turning path, as basis for determination of the turning curve. The controller may be provided in the vehicle body, and be electrically connected with the vehicle body and the detection assembly, to control traveling of the vehicle body according to the position information detected by the detection assembly. Herein, when the vehicle body is turning, the controller determines the turning curve of the vehicle body according to the position information of the initial position and the target position of the vehicle body as well as the kinematic parameters of the vehicle body, thus in turn controlling the vehicle body to turn according to the turning curve, turning from the initial position to the target position. Herein in the turning curve, the portion in which the curvature thereof changes is the transition curve, and the portion in which the curvature thereof remains unchanged is a straight line or a circular arc, such that the vehicle body can achieve continuous changing in curvature during turning, without a spot-turning phenomenon. In particular, when the construction machine is a road construction machine, it can effectively prevent damage to road surfaces under construction due to spot-turning, without affecting construction quality and precision. The kinematic parameters include: a minimum turning radius and a turning travel speed of the construction machine, and a switching time period for the construction machine to switch from a state of traveling straight to a state of turning with the minimum turning radius, for calculating the curve equation(s) of the transition curve.

In combination with the third aspect, in some embodiments, construction machine is an unmanned construction machine.

In this technical solution, construction machine is an unmanned construction machine. That is, the construction machine, under full controlling of the controller, can perform construction operations, not limited to traveling straight and turning of the vehicle body, and further including approaching, transferring, lane changing, position adjusting, and the like, as well as respective working operations. The unmanned construction machine can effectively reduce manual operation processes and lower labor intensity, and also can significantly improve accuracy, precision and construction quality of the construction operations. In particular, during turning, it is understandable that the precision and accuracy of manual operations are relatively low. Even if the turning path is arranged in advance, it can not be ensured that the actual traveling trace can be completely in conformity with the turning path. The actual traveling trace will inevitably include a point with sudden change in curvature, i.e. the position in which a spot-turning occurs, prone to cause damage to road surfaces under construction. In the present solution, the unmanned construction machine can precisely control the vehicle body to turn along the arranged turning path, and a phenomenon of spot-turning can be effectively avoided.

In a fourth aspect, the present disclosure provides a computer device. The computer device includes: a processor; and a memory, configured to store a computer program which when executed by the processor causes the processor to perform the turning control method for a construction machine in the above first aspect.

According to the technical solution of the fourth aspect of the present disclosure, the computer device stores and travels the computer program to achieve the turning control method for a construction machine according to any one of the technical solutions in the above first aspect such that the construction machine achieve turning operation(s) with curvature changing continuously. In addition, the computer device in the present solution should also have all the beneficial effects of the turning controlling system for the construction machine in the technical solutions of the above first aspect, which will not be described herein repeatedly.

The additional aspects and advantages of the present disclosure will become apparent in the following description part, or can be understood by implementation of the present disclosure.

BRIEF DESCRIPTION OF DRAWINGS

The above and/or additional aspects and advantages of the present disclosure will become apparent and easily understandable by the description of embodiments in combination with accompanying drawings hereinafter, wherein.

DETAILED DESCRIPTION OF THE EMBODIMENTS

In order to make the above purpose(s), features and advantages of the present disclosure more understandable, specific embodiments of the present disclosure will be further described in detail in combination with the accompanying drawings. It should be noted that the embodiments and the features therein of the present disclosure can be combined with one another, unless there is a contradiction in the context.

Several specific details will be explained in the following description to facilitate complete understanding for the present disclosure. However, the present disclosure may be implemented in other ways different from those as described herein. Therefore, the protection scope of the present disclosure will not be limited to the following disclosed specific embodiments.

Hereinafter, referring to FIGS. 1-19, a turning control method for a construction machine, a control device, a construction machine and a computer device according to some embodiments of the present disclosure will be described.

Figure 1:
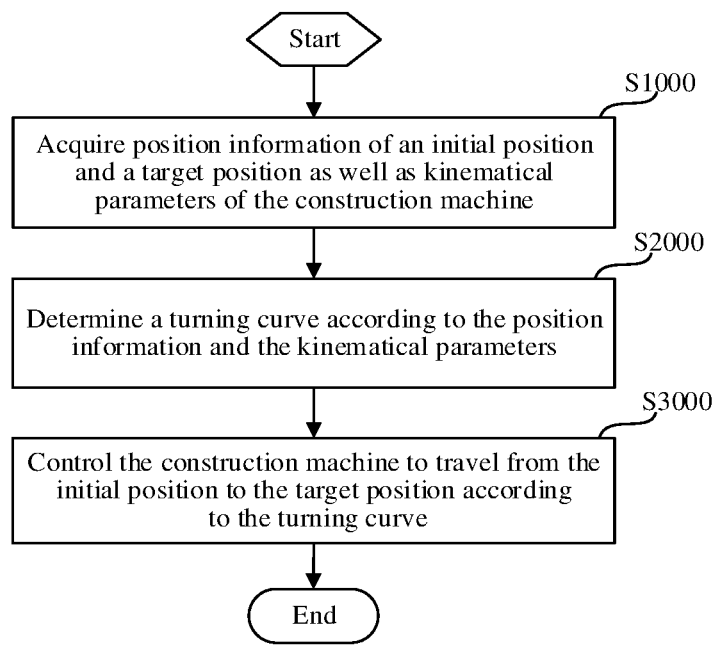
FIG. 1 is a schematic flowchart of a turning control method for a construction machine according to an embodiment of the present disclosure.

FIG. 1 is a schematic flowchart of a turning control method for a construction machine according to an embodiment of the present disclosure.

As shown in FIG. 1, in the embodiment, the turning control method may include the following steps.

Step S1000: position information of an initial position and a target position as well as kinematic parameters of the construction machine are acquired.

Step S2000: a turning curve is determined according to the position information and the kinematic parameters.

Step S3000: the construction machine is controlled to travel from the initial position to the target position according to the turning curve.

Herein the kinematic parameters include a minimum turning radius of the construction machine, a turning travel speed of the construction machine, and a switching time period for the construction machine to switch from a state of traveling straight to a state of turning with the minimum turning radius. In addition, a portion of the turning curve in which curvature thereof varies is a transition curve.

In the present embodiment, by Step S1000, it is to acquire position information of an initial position and a target position of the construction machine to determine positions of starting and ending points during turning, and it is also to acquire kinematic parameters of the construction machine, including a minimum turning radius of the construction machine, a turning travel speed of the construction machine, and a switching time period for the construction machine to switch from a state of traveling straight to a state of turning with the minimum turning radius, to facilitate usage for determination of the turning curve in the subsequent step(s). By Step S2000, it is to determine a turning curve during turning by mathematical calculation, according to the position information of the starting and ending positions and the kinematic parameters, as a path reference for turning of the construction machine, wherein a portion of the turning curve in which curvature thereof varies is a transition curve (a curve provided between a straight line and a circular curve or between a circular curve and another circular curve, with its curvature changing continuously), to ensure that the turning curve does not include any point with sudden change in curvature. In Step S3000, it is to control the construction machine to travel from the initial position to the target position according to the turning curve such that the construction machine can achieve continuous changing in curvature during the whole turning, without a spot-turning phenomenon.

The turning control method for a construction machine as provided in this embodiment can effectively prevent damage to road surfaces under construction, especially for road construction machines such as a road roller, facilitating controlling quality and construction precision of road surfaces under construction and reducing error during turning. Also, it is suitable for turning operations of the construction machine during approaching, transferring, lane changing, position adjusting, and the like, with a wide range of applications.

Figure 2:
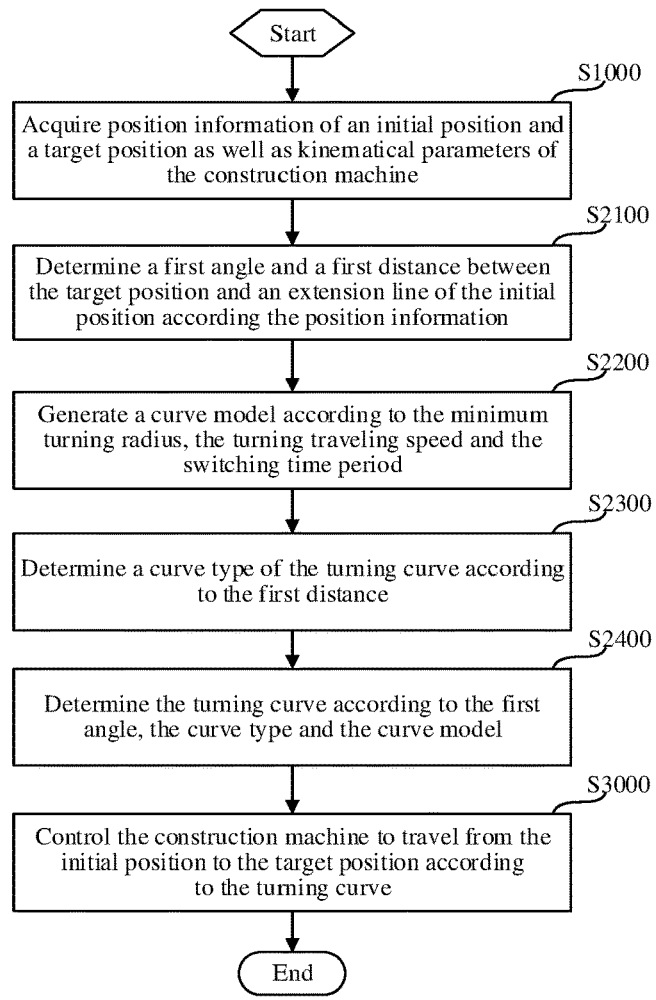
FIG. 2 is a schematic flowchart of a turning control method for a construction machine according to another embodiment of the present disclosure.

FIG. 2 is a schematic flowchart of a turning control method for a construction machine according to another embodiment of the present disclosure.

As shown in FIG. 2, in the present embodiment, the turning control method may include the following steps.

Step S1000: position information of an initial position and a target position as well as kinematic parameters of the construction machine are acquired.

Step S2100: a first angle and a first distance between the target position and an extension line of the initial position are determined according the position information.

Step S2200: a curve model is generated according to the minimum turning radius, the turning travel speed and the switching time period.

Step S2300: a curve type of the turning curve is determined according to the first distance.

Step S2400: the turning curve is determined according to the first angle, the curve type and the curve model.

Step S3000: the construction machine is controlled to travel from the initial position to the target position according to the turning curve.

Herein the kinematic parameters include a minimum turning radius of the construction machine, a turning travel speed of the construction machine, and a switching time period for the construction machine to switch from a state of traveling straight to a state of turning with the minimum turning radius (i.e. the switching time period in S2200); a portion of the turning curve in which curvature thereof varies is a transition curve. The first angle is a supplementary angle to a turning angle of the construction machine. The curve type is determined from various types according to whether it is necessary for the construction machine to travel straight. The curve model can be used for calculating the turning curve for the construction machine to travel from the initial position to the target position.

The turning control method for a construction machine as provided in the embodiment is further improved with respect to Step S2000 based on the embodiment shown in FIG. 1. By Step S2100, it is to determine a first angle according the position information of the initial position and the target position, and to determine a first distance between the target position and an extension line of the initial position, as the calculation basis for subsequent determination of the turning curve. Herein the first angle is a supplementary angle to a turning angle for turning from the initial position to the target position. By Step S2200, it is to create and calculate a curve model for the turning curve according to the kinematic parameters (i.e. the minimum turning radius, the turning travel speed and the switching time period) of the construction machine, for calculate the turning curve from the initial position to the target position. The curve type of the turning curve is determined from various types according to whether it is necessary for the construction machine to travel straight, and the calculation process for the turning curve is different for each type. By Step S2300, it is possible to determine a curve type of the turning curve according to the value of the first distance. Finally, by Step S2400, it is possible for calculating a curve equation of the turning curve according to the first angle, the curve type and the curve model, i.e. determining the turning curve.

Figure 3:
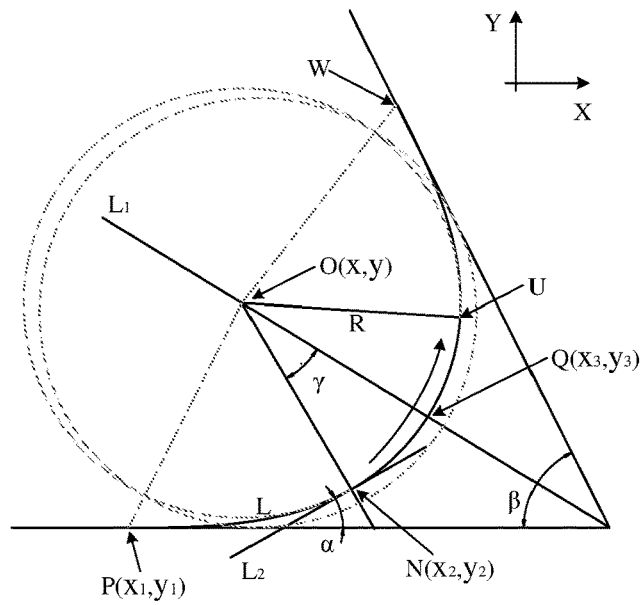
FIG. 3 is a schematic diagram of a curve model according to an embodiment of the present disclosure.

For example, for the curve model shown in FIG. 3, the turning curve is the curve PW, wherein $\alpha$ is a turning angle (i.e. tangential deviation angle) of the transition curve PN; $\gamma$ is a turning angle from Point N (i.e. a connection point of the transition curve PN and the circular arc NQ) to an angle bisector L1 of the first angle $\beta$; $\beta$ is the first angle, and $\pi-\beta$ is the turning angle of the whole turning curve PW; R is the minimum turning radius, L is the length of the transition curve, V is the turning travel speed, t is the switching time period for the construction machine to switch from a state of traveling straight to a state of turning with the minimum turning radius. The turning curve PW includes two transition curves PN and UW as well as two circular arcs NQ and QU. The initial position P and the target position W are respectively located at the starting point and the ending point of the two transition curves. The two circular arcs are connected with the two transition curves. Moreover, the two transition curves and the two circular arcs are axisymmetrical with respect to the angle bisector L1 of the first angle $\beta$. Point O is the circular center of the circular arcs NQ and QU. It can be obtained by geometrical relation that: $2\alpha+2\gamma=\pi-\beta$, and $\alpha=L/(2R)$; and the transition curve PN is defined based on the equations: $r\times l=R\times L$, and $L=V\times t$. Herein, r is an instantaneous turning radius, and l is a length of the transition curve corresponding to the instantaneous turning radius. With the equations of the transition curve PN and the circular arc NQ as well as the symmetrical relation with respect to L1, the equations of the circular arc QU and the transition curve UW can be determined, thus determining the whole turning curve PW.

Figure 4:
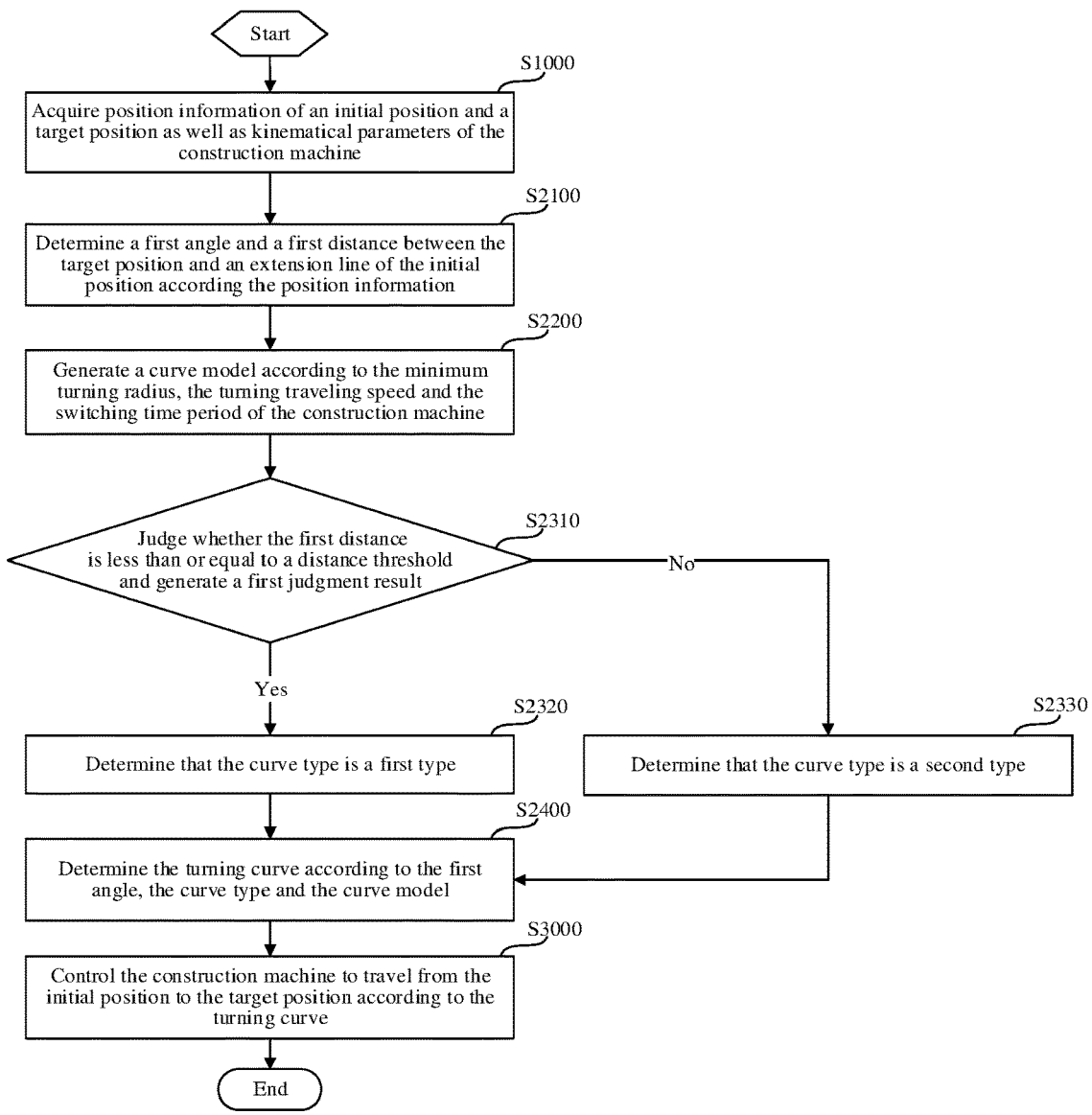
FIG. 4 is a schematic flowchart of a turning control method for a construction machine according to another embodiment of the present disclosure.

FIG. 4 is a schematic flowchart of a turning control method for a construction machine according to another embodiment of the present disclosure.

As shown in FIG. 4, in the embodiment, the turning control method may include the following steps.

Step S1000: position information of an initial position and a target position as well as kinematic parameters of the construction machine are acquired.

Step S2100: a first angle and a first distance between the target position and an extension line of the initial position are determined according the position information.

Step S2200: a curve model is generated according to the minimum turning radius, the turning travel speed and the switching time period of the construction machine.

Step S2310: whether the first distance is less than or equal to a distance threshold is judged, and a first judgment result is generated; if the first judgment result is yes, performing Step S2320; and if the first judgment result is no, performing Step S2330.

Step S2320: It is determined that the curve type is a first type.

Step S2330: It is determined that the curve type is a second type.

Step S2400: the turning curve is determined according to the first angle, the curve type and the curve model.

Step S3000: the construction machine is controlled to travel from the initial position to the target position according to the turning curve.

Herein the kinematic parameters include a minimum turning radius of the construction machine, a turning travel speed of the construction machine, and a switching time period for the construction machine to switch from a state of traveling straight to a state of turning with the minimum turning radius (i.e. the switching time period in S2200); a portion of the turning curve in which curvature thereof varies is a transition curve; the first angle is a supplementary angle to a turning angle of the construction machine, the curve type is determined from various types according to whether it is necessary for the construction machine to travel straight, and the curve model can be used for calculating the turning curve for the construction machine to travel from the initial position to the target position. In a case that the curve type is the first type, the construction machine can achieve traveling from the initial position to the target position only by turning, and in a case that the curve type is the second type, the construction machine may achieve traveling from the initial position to the target position by multiple times of turning and traveling straight as needed.

Figure 5:
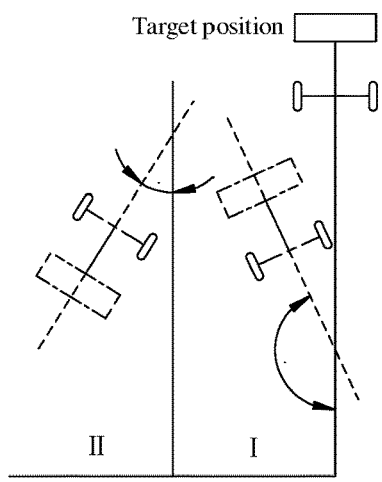
FIG. 5 is a schematic diagram of correspondence between a position and a curve type of a construction machine according to an embodiment of the present disclosure.

The turning control method for a construction machine as provided in the embodiment is further improved with respect to Step S2300 based on the embodiment shown in FIG. 2. As shown in FIG. 5, the curve type of the turning curve is determined from two types: a first type and a second type. In a case that the turning curve is the first type, the initial position is relatively close from the target position, and it is possible to travel from the initial position to the target position directly by turning, without traveling straight. In a case that the turning curve is the second type, the initial position is relatively far from the target position, and it is necessary to perform multiple times of turning and traveling straight so as to reach the target position. By Step S2310, it is to judge whether the first distance is less than or equal to a distance threshold and to generate a first judgment result, so as to determine the curve type of the turning curve to facilitate determination of the turning curve according to the corresponding curve type in the subsequent step(s). If the first judgment result is yes, it means that the initial position is relatively close from the target position, thus determining that the curve type is a first type; otherwise, it means that the initial position is relatively far from the target position, determining that the curve type is a second type.

It should be noted that in a case that the turning curve is the second type and the turning angle is sufficiently large, it is also possible for the construction machine to directly turn from the initial position to the target position. However, it is not easy to achieve such operation during practical construction due to a relatively long path and a relatively large space needed. Instead, the turning is thus achieved in a relatively small range by multiple times of turning and traveling straight.

Figure 6:
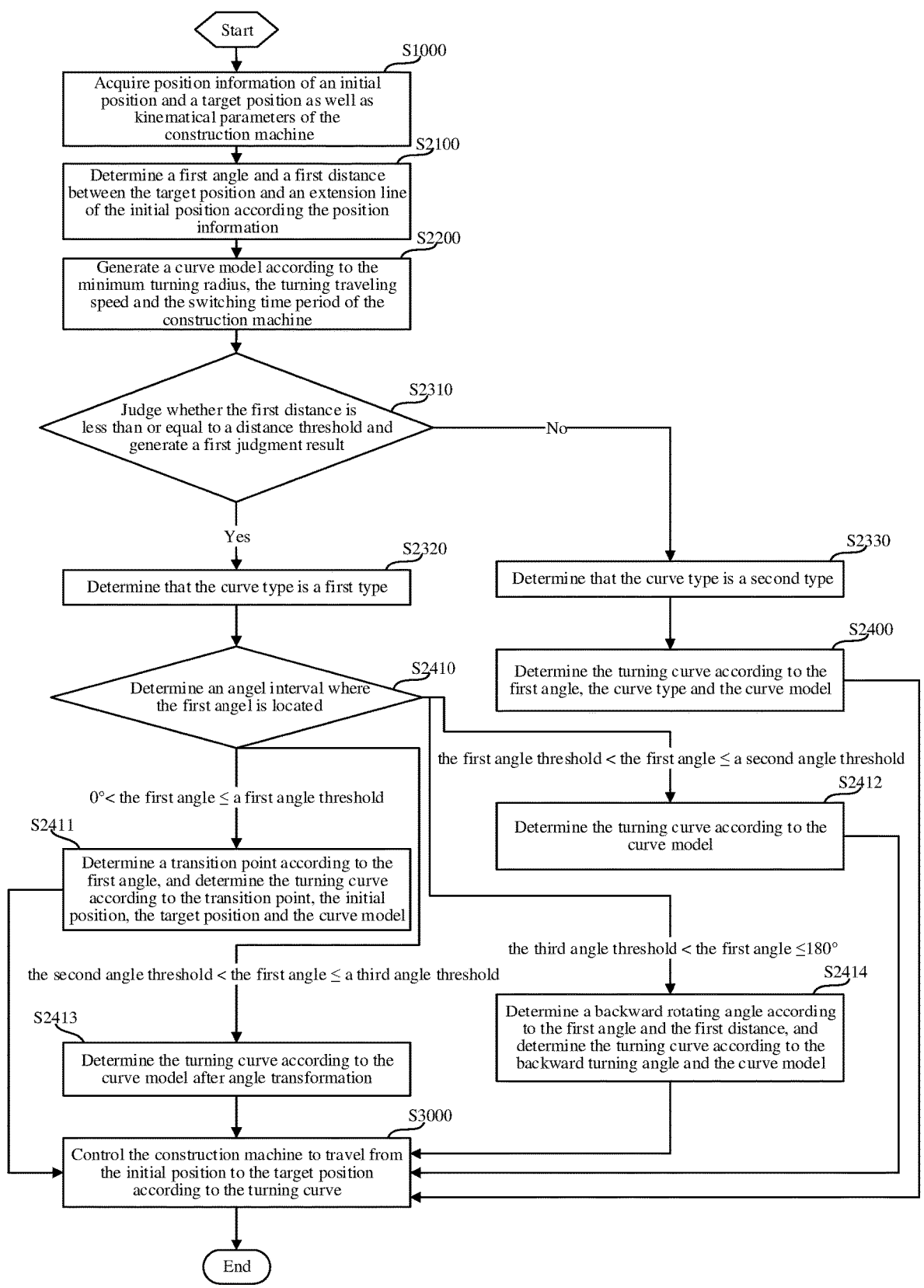
FIG. 6 is a schematic flowchart of a turning control method for a construction machine according to another embodiment of the present disclosure.

FIG. 6 is a schematic flowchart of a turning control method for a construction machine according to another embodiment of the present disclosure.

As shown in FIG. 6, in the embodiment, the turning control method may include the following steps.

Step S1000: position information of an initial position and a target position as well as kinematic parameters of the construction machine are acquired.

Step S2100: a first angle and a first distance between the target position and an extension line of the initial position are determined according the position information.

Step S2200: a curve model is generated according to the minimum turning radius, the turning travel speed and the switching time period of the construction machine.

Step S2310: whether the first distance is less than or equal to a distance threshold is judged, and a first judgment result is generated; if the first judgment result is yes, performing the following steps S2320-S2414; and if the first judgment result is no, performing the following steps S2330-S2400.

Step S2320: it is determined that the curve type is a first type.

Step S2410: an angle range where the first angle is located is determined.

If 0°<the first angle≤a first angle threshold, performing Step S2411: a transition point is determined according to the first angle, and the turning curve is determined according to the transition point, the initial position, the target position and the curve model.

If the first angle threshold<the first angle≤a second angle threshold, performing Step S2412: the turning curve is determined according to the curve model.

If the second angle threshold<the first angle≤a third angle threshold, performing Step S2413: the turning curve is determined according to the curve model after angle transformation.

If the third angle threshold<the first angle≤180°, performing Step S2414: a backward turning angle is determined according to the first angle and the first distance, and the turning curve is determined according to the backward turning angle and the curve model.

Step S2330: it is determined that the curve type is a second type.

Step S2400: the turning curve is determined according to the first angle, the curve type and the curve model.

Step S3000: the construction machine is controlled to travel from the initial position to the target position according to the turning curve.

Herein the kinematic parameters include a minimum turning radius of the construction machine, a turning travel speed of the construction machine, and a switching time period for the construction machine to switch from a state of traveling straight to a state of turning with the minimum turning radius (i.e. the switching time period in S2200); a portion of the turning curve in which curvature thereof varies is a transition curve; the first angle is a supplementary angle to a turning angle of the construction machine, the curve type is determined from various types according to whether it is necessary for the construction machine to travel straight, and the curve model can be used for calculating the turning curve for the construction machine to travel from the initial position to the target position. In a case that the curve type is the first type, the construction machine can achieve traveling from the initial position to the target position only by turning, and in a case that the curve type is the second type, the construction machine may achieve traveling from the initial position to the target position by multiple times of turning and traveling straight as needed. The first angle threshold and the third angle threshold are preset values, the second angle threshold is two times of a complementary angle to a tangential deviation angle of the transition curve, the backward turning angle is an angle by which the construction machine travels backward from the initial position and turns until a vehicle axis of the construction machine is coaxial with that of the construction machine at the target position.

The turning control method for a construction machine as provided in the embodiment is further improved with respect to Step S2400 based on the embodiment shown in FIG. 4. In a case that the curve type is the first type, by Step S2410, the angle range where the first angle is located can be determined, so that the calculation method for a turning curve in various circumstances can be determined. In the range of (0°, 180°], three thresholds are set: a first angle threshold $\beta_0$, a second angle threshold $\pi-2\alpha$, a third angle threshold $\beta_1$, wherein the first angle threshold $\beta_0$ is less than the second angle threshold $\pi-2\alpha$, and the second angle threshold $\pi-2\alpha$ is less than the third angle threshold $\beta_1$. According to the above three thresholds, four angle ranges are formed. Herein the first angle threshold $\beta_0$ and the third angle threshold $\beta_1$ are preset values and are determined according to experiments or operation experience, and the second angle threshold is determined according to geometrical relation.

Figure 7:
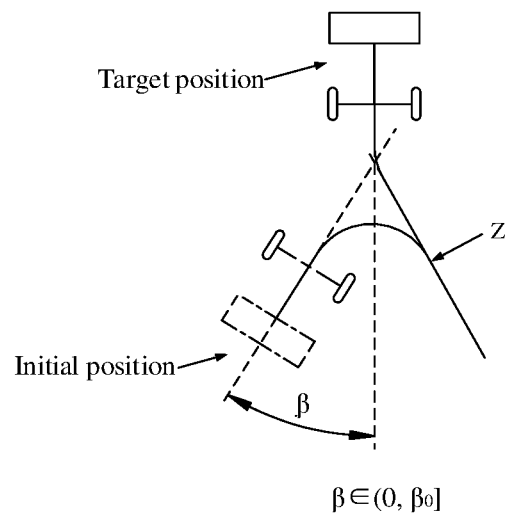
FIG. 7 is a schematic diagram of turning of a construction machine according to an embodiment of the present disclosure.

As shown in FIG. 7, in a case that $0<\beta\leq\beta_0$, the turning angle is relatively large, and the construction machine can not travel from the initial position to the target position by one turning. By Step S2411, it is to determine a transition point (i.e. Point Z in FIG. 7) according to the first angle. The construction machine first travels backward and turn by an angle $\beta+2\alpha$ to the transition point according to the curve model, and then travels forward towards the target position and turn by an angle $\pi-2\alpha$ to the target position according to the curve model. The path curves during the two turning processes are calculated respectively, thus determining the complete turning curve.

Figure 8:
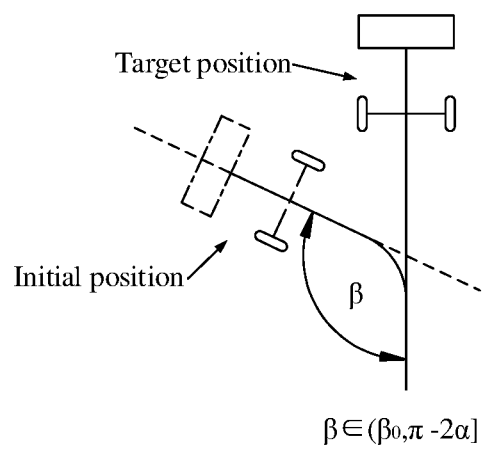
FIG. 8 is a schematic diagram of turning of a construction machine according to another embodiment of the present disclosure.

As shown in FIG. 8, in a case that $\beta_0<\beta\leq\pi-2\alpha$, it is in conformity with the position relation in the curve model. By Step S2412, it is possible to directly determine the turning curve according to the curve model.

Figure 9:
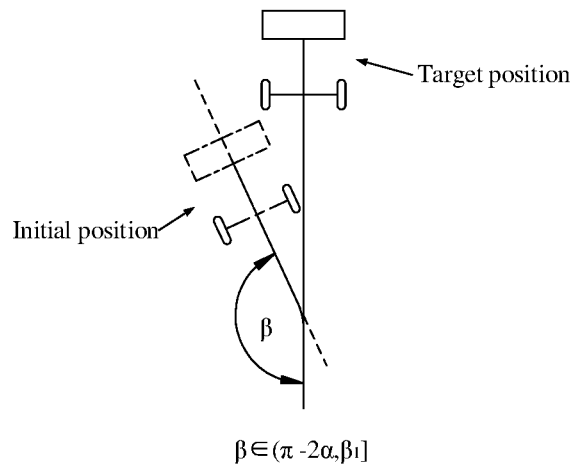
FIG. 9 is a schematic diagram of turning of a construction machine according to another embodiment of the present disclosure.

As shown in FIG. 9, in a case that $\pi-2\alpha<\beta\leq\beta_1$, the position relation is similar to that in FIG. 8, and will be in conformity with the curve model by angle mathematical transformation. By Step S2413, it is to perform angle mathematical transformation $$\left(\alpha' = \frac{\pi-\beta}{2} = \frac{l^2}{2C}, C = R \times L\right)$$

for the curve model, thus determining the turning curve.

Figure 10:
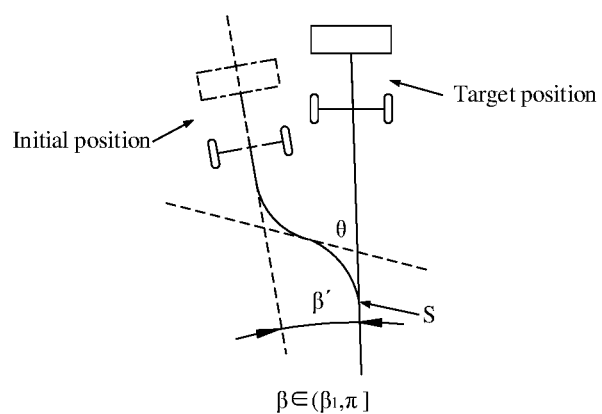
FIG. 10 is a schematic diagram of turning of a construction machine according to another embodiment of the present disclosure.

As shown in FIG. 10, in a case that $\beta_1<\beta\leq\pi$, the turning angle $\beta'$ is relatively small, it is necessary for the construction machine to travel backward and turn until the vehicle axis of the construction machine is coaxial with that when the construction machine is at the target position, and then to travel straight along the vehicle axis to the target position. According to the value of the first angle $\beta$, a backward turning angle $\theta$ can be determined. According to the curve model and the backward turning angle $\theta$, the curve portion of traveling backward and turning can be determined. The curve portion can be combined with a straight line portion to determine the complete turning curve.

Figure 11:
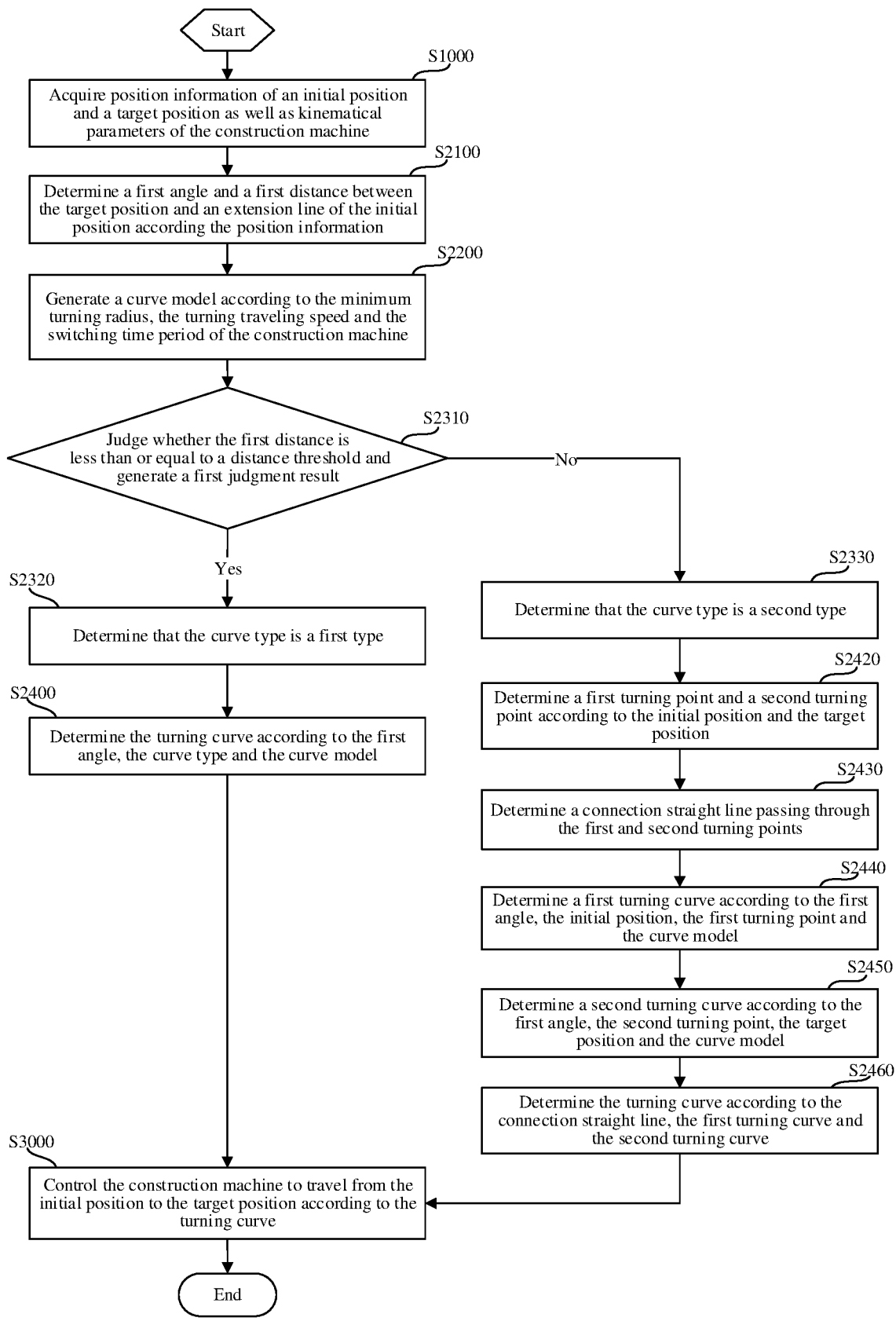
FIG. 11 is a schematic flowchart of a turning control method for a construction machine according to another embodiment of the present disclosure.

FIG. 11 is a schematic flowchart of a turning control method for a construction machine according to another embodiment of the present disclosure.

As shown in FIG. 11, in the embodiment, the turning control method may include the following steps.

Step S1000: position information of an initial position and a target position as well as kinematic parameters of the construction machine are acquired.

Step S2100: a first angle and a first distance between the target position and an extension line of the initial position are determined according the position information.

Step S2200: a curve model is generated according to the minimum turning radius, the turning travel speed and the switching time period.

Step S2310: whether the first distance is less than or equal to a distance threshold is judged, and a first judgment result is generated; if the first judgment result is yes, performing Steps S2320-S2400; and if the first judgment result is no, performing Steps S2330-S2460.

Step S2320: it is determined that the curve type is a first type.

Step S2400: the turning curve is determined according to the first angle, the curve type and the curve model.

Step S2330: it is determined that the curve type is a second type.

Step S2420: a first turning point and a second turning point is determined according to the initial position and the target position.

Step S2430: a connection straight line passing through the first and second turning points is determined.

Step S2440: a first turning curve is determined according to the first angle, the initial position, the first turning point and the curve model.

Step S2450: a second turning curve is determined according to the first angle, the second turning point, the target position and the curve model.

Step S2460: the turning curve is determined according to the connection straight line, the first turning curve and the second turning curve.

Step S3000: the construction machine is controlled to travel from the initial position to the target position according to the turning curve.

Herein the kinematic parameters include a minimum turning radius of the construction machine, a turning travel speed of the construction machine, and a switching time period for the construction machine to switch from a state of traveling straight to a state of turning with the minimum turning radius (i.e. the switching time period in S2200); a portion of the turning curve in which curvature thereof varies is a transition curve; the first angle is a supplementary angle to a turning angle of the construction machine, the curve type is determined from various types according to whether it is necessary for the construction machine to travel straight, and the curve model can be used for calculating the turning curve for the construction machine to travel from the initial position to the target position. In a case that the curve type is the first type, the construction machine can achieve traveling from the initial position to the target position only by turning. In a case that the curve type is the second type, the construction machine may achieve traveling from the initial position to the target position by multiple times of turning and traveling straight as needed. The first turning point is an ending point of the path along which the construction machine turns from the initial position onto the connection straight line, and the second turning point is a starting point of the path along which the construction machine turns from the connection straight line to the target position.

Figure 12:
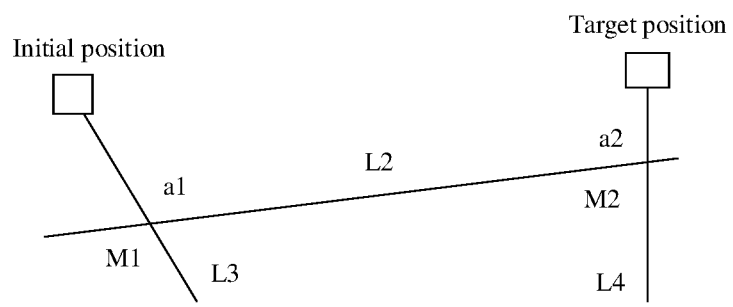
FIG. 12 is a schematic diagram of turning of a construction machine according to another embodiment of the present disclosure.

The turning control method for a construction machine as provided in the embodiment is further improved with respect to Step S2400 based on the embodiment shown in FIG. 4. As shown in FIG. 12, in a case that the curve type is the second type, the initial position is relatively far from the target position, it is necessary to perform turning for two times and traveling straight between such two turning processes. By Step S2420, it is to determine a first turning point (Point M1 in FIG. 12, being the ending point of the first turning) and a second turning point (Point M2 in FIG. 12, being the starting point of the second turning) according to the initial position and the target position. By Step S2430, it is to determine a connection straight line L2 passing through the first and second turning points, to determine a path for traveling straight between the two turnings. By Step S2440, it is to determine a first turning curve of the first turning process according to the first angle, the initial position, the first turning point and the curve model. By Step S2450, it is possible to determine a second turning curve of the second turning process according to the first angle, the second turning point, the target position and the curve model. Further, by Step S2460, it is possible to connect the first turning curve, the connection straight line L2 and the second turning curve to obtain a complete turning curve from the initial position to the target position, such as the path curve shown in solid line in FIG. 13.

It should be noted that, in a case that the turning curve is the second type and the turning angle is sufficiently large, it is also possible to directly turn from the initial position to the target position. However, it is not easy to achieve such operation during practical construction due to a relatively long path and a relatively large space needed. Instead, the turning is thus achieved in a relatively small range by multiple times of turning and traveling straight.

Figure 14:
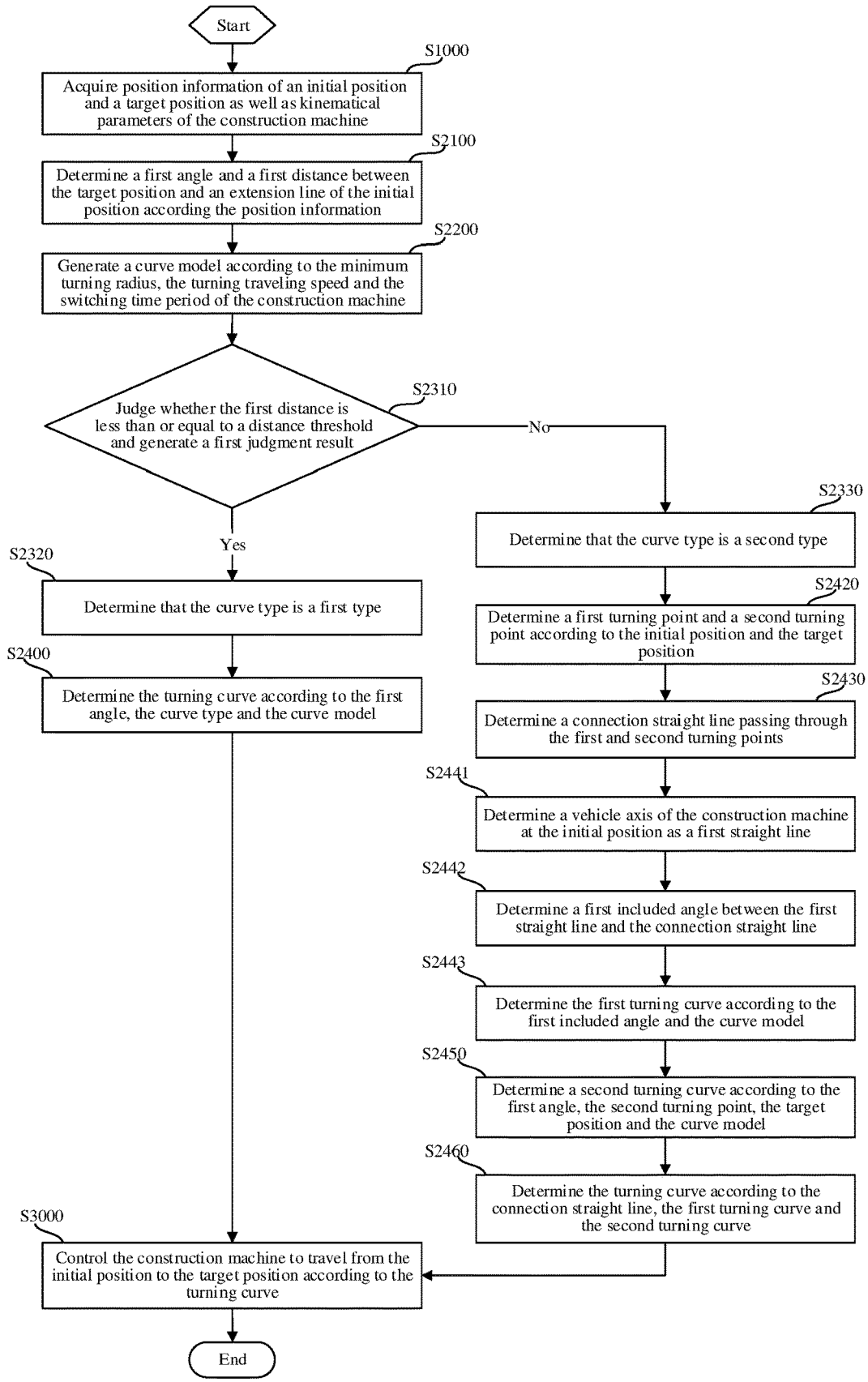
FIG. 14 is a schematic flowchart of a turning control method for a construction machine according to another embodiment of the present disclosure.

FIG. 14 is a schematic flowchart of a turning control method for a construction machine according to another embodiment of the present disclosure.

As shown in FIG. 14, in the embodiment, the turning control method may include the following steps.

Step S1000: position information of an initial position and a target position as well as kinematic parameters of the construction machine are acquired.

Step S2100: a first angle and a first distance between the target position and an extension line of the initial position are determined according the position information.

Step S2200: a curve model is generated according to the minimum turning radius, the turning travel speed and the switching time period.

Step S2310: whether the first distance is less than or equal to a distance threshold is judged, and a first judgment result is generated; if the first judgment result is yes, performing Steps S2320-S2400; and if the first judgment result is no, performing Steps S2330-S2460.

Step S2320: it is determined that the curve type is a first type.

Step S2400: the turning curve is determined according to the first angle, the curve type and the curve model.

Step S2330: it is determined that the curve type is a second type.

Step S2420: a first turning point and a second turning point is determined according to the initial position and the target position.

Step S2430: a connection straight line passing through the first and second turning points is determined.

Step S2441: a vehicle axis of the construction machine at the initial position is determined as a first straight line.

Step S2442: a first included angle between the first straight line and the connection straight line is determined.

Step S2443: the first turning curve is determined according to the first included angle and the curve model.

Step S2450: a second turning curve is determined according to the first angle, the second turning point, the target position and the curve model.

Step S2460: the turning curve is determined according to the connection straight line, the first turning curve and the second turning curve.

Step S3000: the construction machine is controlled to travel from the initial position to the target position according to the turning curve.

Herein the kinematic parameters include a minimum turning radius of the construction machine, a turning travel speed of the construction machine, and a switching time period for the construction machine to switch from a state of traveling straight to a state of turning with the minimum turning radius (i.e. the switching time period in S2200); a portion of the turning curve in which curvature thereof varies is a transition curve; the first angle is a supplementary angle to a turning angle of the construction machine, the curve type is determined from various types according to whether it is necessary for the construction machine to travel straight, and the curve model can be used for calculating the turning curve for the construction machine to travel from the initial position to the target position. In a case that the curve type is the first type, the construction machine can achieve traveling from the initial position to the target position only by turning, and In a case that the curve type is the second type, the construction machine may achieve traveling from the initial position to the target position by multiple times of turning and traveling straight as needed. The first turning point is an ending point of the path along which the construction machine turns from the initial position onto the connection straight line, and the second turning point is a starting point of the path along which the construction machine turns from the connection straight line to the target position.

Figure 13:
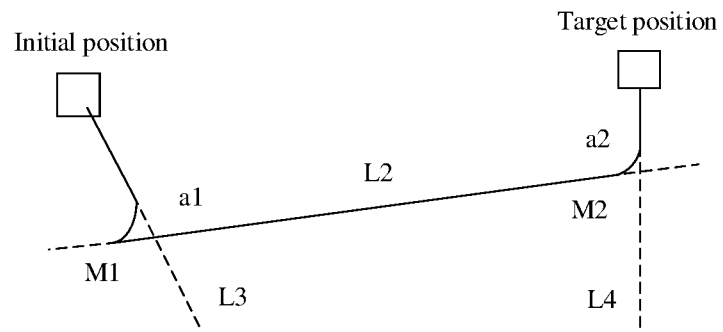
FIG. 13 is a schematic diagram of turning of a construction machine according to another embodiment of the present disclosure.

The turning control method for a construction machine as provided in the embodiment is further improved with respect to Step S2440 based on the embodiment shown in FIG. 11. As shown in FIG. 12 and FIG. 13, in Step S2441, according to the initial position, it is possible to determine the orientation of the construction when the construction machine is at the initial position, and determine the vehicle axis at this time as a first straight line L3. In Step S2442, it is to determine an angle (i.e. the first included angle a1) between the first straight line L3 and the connection straight line L2. Further, by Step S2443, it is to determine a turning path (i.e. the first turning curve) from the initial position to the first turning point M1 according to the first included angle a1 and the curve model, such that the first turning curve does not present any phenomenon with sudden change in curvature.

Figure 15:
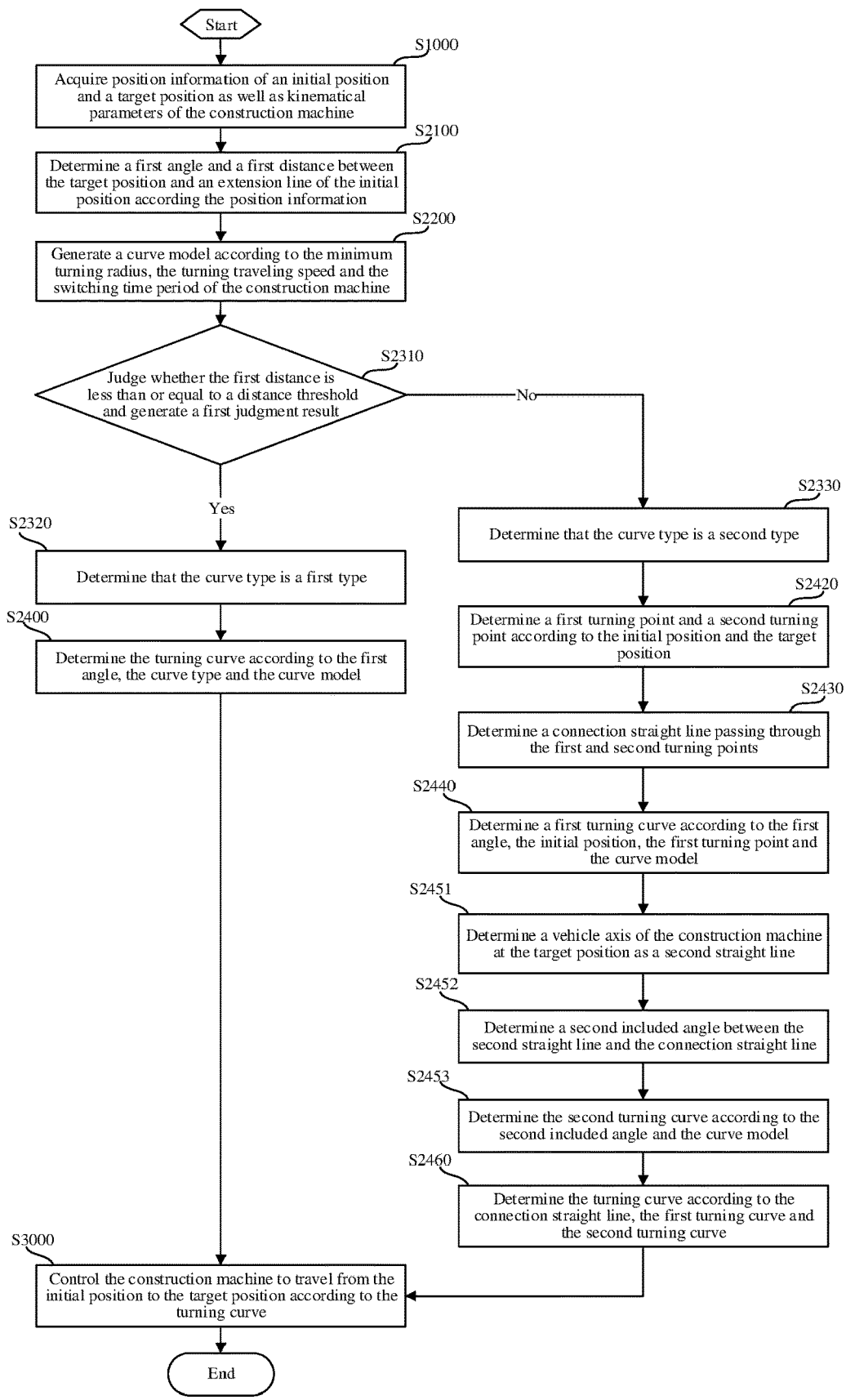
FIG. 15 is a schematic flowchart of a turning control method for a construction machine according to another embodiment of the present disclosure.

FIG. 15 is a schematic flowchart of a turning control method for a construction machine according to another embodiment of the present disclosure.

As shown in FIG. 15, in the embodiment, the turning control method may include the following steps.

Step S1000: position information of an initial position and a target position as well as kinematic parameters of the construction machine are acquired.

Step S2100: a first angle and a first distance between the target position and an extension line of the initial position are determined according the position information.

Step S2200: a curve model is generated according to the minimum turning radius, the turning travel speed and the switching time period of the construction machine.

Step S2310: whether the first distance is less than or equal to a distance threshold is judged, and a first judgment result is generated; if the first judgment result is yes, performing Steps S2320-S2400; and if the first judgment result is no, performing Steps S2330-S2460.

Step S2320: it is determined that the curve type is a first type.

Step S2400: the turning curve is determined according to the first angle, the curve type and the curve model.

Step S2330: it is determined that the curve type is a second type.

Step S2420: a first turning point and a second turning point is determined according to the initial position and the target position.

Step S2430: a connection straight line passing through the first and second turning points is determined.

Step S2440: a first turning curve is determined according to the first angle, the initial position, the first turning point and the curve model.

Step S2451: a vehicle axis of the construction machine at the target position is determined as a second straight line.

Step S2452: a second included angle between the second straight line and the connection straight line is determined.

Step S2453: the second turning curve is determined according to the second included angle and the curve model.

Step S2460: the turning curve is determined according to the connection straight line, the first turning curve and the second turning curve.

Step S3000: the construction machine is controlled to travel from the initial position to the target position according to the turning curve.

Herein the kinematic parameters include a minimum turning radius of the construction machine, a turning travel speed of the construction machine, and a switching time period for the construction machine to switch from a state of traveling straight to a state of turning with the minimum turning radius (i.e. the switching time period in S2200); a portion of the turning curve in which curvature thereof varies is a transition curve; the first angle is a supplementary angle to a turning angle of the construction machine, the curve type is determined from various types according to whether it is necessary for the construction machine to travel straight, and the curve model can be used for calculating the turning curve for the construction machine to travel from the initial position to the target position. In a case that the curve type is the first type, the construction machine can achieve traveling from the initial position to the target position only by turning, and in a case that the curve type is the second type, the construction machine may achieve traveling from the initial position to the target position by multiple times of turning and traveling straight as needed. The first turning point is an ending point of the path along which the construction machine turns from the initial position onto the connection straight line, and the second turning point is a starting point of the path along which the construction machine turns from the connection straight line to the target position.

The turning control method for a construction machine as provided in the embodiment is further improved with respect to Step S2450 based on the embodiment shown in FIG. 11. As shown in FIG. 12 and FIG. 13, by Step S2451, it is possible to determine the orientation of the construction machine when the construction machine is at the target position according to the target position, and determine the vehicle axis at this time as a second straight line L4. By Step S2452, it is to determine an angle (i.e. the second included angle a2) between the second straight line L4 and the connection straight line L2, thus determining a turning path (i.e. the second turning curve) from the second turning point M2 to the target position according to the second included angle a2 and the curve model, such that the second turning curve does not present any phenomenon with sudden change in curvature.

In order to describe the turning control method for a construction machine as provided in the embodiment(s) of the present disclosure more clearly and completely, a specific example is provided hereinafter in combination with FIG. 16.

Figure 16:
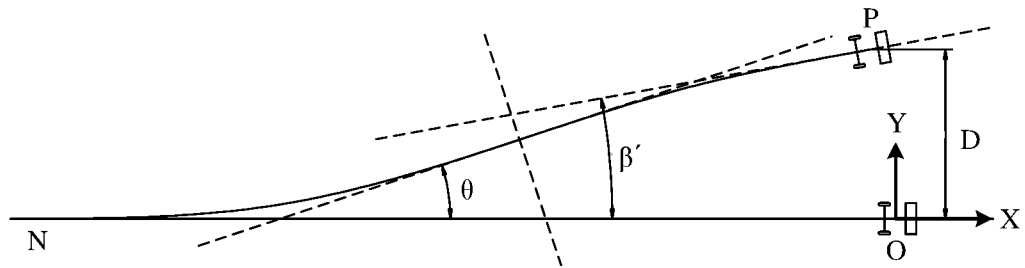
FIG. 16 is a schematic diagram of turning of a construction machine according to another embodiment of the present disclosure.

As shown in FIG. 16, with the midpoint of the vehicle axis when the construction machine is at the target position being an original point and a direction of traveling forward along the vehicle axis being X axis, a Cartesian coordinate system is formed. The initial position is Point P and the target position is Point O, a distance from the initial position Point P to the X axis is D, and the first angle is $\beta$. For example, the construction machine can use a detection device to acquire the position information of the initial position Point P and the target position Point O, and can determine that the turning angle $\beta'=0.18$ rad, the first angle $\beta=\pi-\beta'$, and the distance D=1.52 m. The kinematic parameters of the construction machine include: a minimum turning radius R=7 m, a turning travel speed V=0.5 m/s, and a switching time period (t=5 s) for the construction machine to switch from a state of traveling straight to a state of turning with the minimum turning radius.

In combination with the above known conditions, it can be determined according to D that the curve type is the first type, and it can be determined by the curve model that an equation of the transition curve is: $r \times l = R \times L = R \times V \times t = 17.5$, $\alpha = L/(2R) = 0.1786$ rad. It can be determined according to the first angle $\beta$ that $\beta$ is in an angle range of $(\beta_1, \pi]$, and it is necessary for the construction machine to first travel backward and turn until the vehicle axis is coaxial with that when the construction machine is at the target position, i.e. being in a position in FIG. 16 where the vehicle axis is coaxial with X axis, and it can be determined by calculation that the backward turning angle $\theta = 0.16$ rad. According to the above parameters and by calculation with local coordinates, it can be obtained that the path curve of the construction machine traveling backward and turning from the initial position Point P to Point N is combined by four transition curve portions. Further, by coordinate transformation, the curve equation of the path curve in the Cartesian coordinate system can be obtained. Furthermore, in combination with a straight line equation of the construction machine traveling straight along X axis, the complete turning curve can be finally determined. The construction machine is controlled according to the complete turning curve to travel, avoiding a spot-turning phenomenon during traveling and thus preventing damage to road surfaces under construction.

Hereinbefore, the turning control methods of the present disclosure are exemplified in combination with FIGS. 1-16. Hereinafter, a turning control device of the present disclosure will be exemplified in combination with FIG. 17. It should be understood that the method embodiments correspond to the device embodiments. For purpose of conciseness, repetitive description will be omitted.

Figure 17:
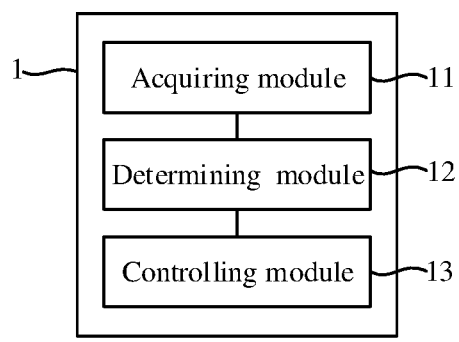
FIG. 17 is a schematic block diagram of a control device of a construction machine according to an embodiment of the present disclosure.

FIG. 17 is a schematic structure diagram of a control device of a construction machine according to an embodiment of the present disclosure.

As shown in FIG. 17, the turning control device 1 may include: an acquiring module 11, a determining module 12 and a controlling module 13.

The acquiring module 11 may be configured to acquiring position information of an initial position and a target position as well as kinematic parameters of the construction machine. The determining module 12 may be configured to determining a turning curve according to the position information and the kinematic parameters. The controlling module 13 may be configured to control the construction machine to travel from the initial position to the target position according to the turning curve.

Herein, the kinematic parameters include a minimum turning radius of the construction machine, a turning travel speed of the construction machine, and a switching time period for the construction machine to switch from a state of traveling straight to a state of turning with the minimum turning radius. Moreover, a portion of the turning curve in which curvature thereof varies is a transition curve.

Figure 18:
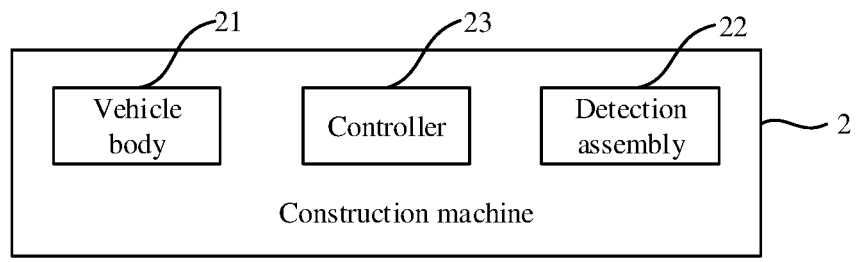
FIG. 18 is a schematic block diagram of a construction machine according to an embodiment of the present disclosure.

In an embodiment of the present disclosure, a construction machine is further provided. FIG. 18 is a schematic block diagram of a construction machine according to an embodiment of the present disclosure.

As shown in FIG. 18, the construction machine 2 includes: a vehicle body 21, a detection assembly 22 and a controller 23.

As the main body of the construction machine 2, the vehicle body 21 is used for carrying various working mechanisms. The detection assembly 22 may be connected with the vehicle body 21, for detecting position information of the vehicle body 21. The position information may include: the initial position, the ending point position, as well as the coordinate information and the angle information of any point on the turning path, for example, as basis for determination of the turning curve. The controller 23 may be provided in the vehicle body 21, and be electrically connected with the vehicle body 21 and the detection assembly 22, to control traveling of the vehicle body 21 according to the position information detected by the detection assembly 22. When the vehicle body 21 is turning, the controller 23 can control the turning of the vehicle body 21 according to the turning control method(s) as provided in the above embodiment(s).

In some embodiments, the construction machine 2 is an unmanned construction machine which, under full controlling of the controller 23, can perform, not limited to, construction operations including traveling straight and turning of the vehicle body 21, and can be used in the application scenarios including approaching, transferring, lane changing, position adjusting, and respective working operations. The unmanned construction machine can effectively reduce manual operation processes and lower labor intensity, and also can significantly improve accuracy, precision and construction quality of the construction operations.

Figure 19:
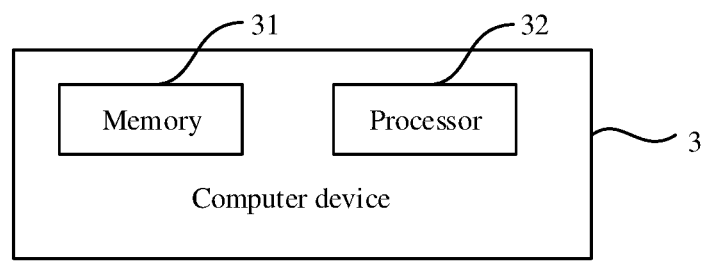
FIG. 19 is a schematic block diagram of a computer device according to an embodiment of the present disclosure.

In an embodiment of the present disclosure, a computer device is further provided. FIG. 19 is a schematic block diagram of a computer device according to an embodiment of the present disclosure.

As shown in FIG. 19, the computer device 3 may include a memory 31 and a processor 32. The memory 31 may be configured to store a computer program which when executed by the processor 32 causes the processor 32 to perform the turning control method for a construction machine of any one of the above embodiments, such that the construction machine can achieve the turning operation with curvature continuously changing. In addition, the computer device 3 in the present embodiment should also have all beneficial effects of the turning controlling system for the construction machine in any one of the above embodiments which will not be described repeatedly.

The technical solutions of the present disclosure, as explained in detail hereinbefore in combination with the figures, it is possible for the curvature to continuously change during turning of the construction machine, without a spot-turning phenomenon, preventing damage to road surfaces under construction, facilitating controlling quality and construction precision of road surfaces under construction and reducing error during turning. It is suitable for various application cases, with a wide range of applications.

In the present disclosure, it is understandable that any process or method described in the flowcharts or in another way herein can be understood as: a module, a fragment or a portion of codes of an executable instruction including one or more steps for achieving a specific logic function or process. The range of the preferred embodiment of the present disclosure includes additional embodiment(s), wherein it is possible to perform a function in a sequence different from the shown or described sequence, including performing the function in a substantially simultaneous way or in an opposite sequence according to the related function. This should be understood by those skilled in the art of the embodiment(s) of the present disclosure.

The logic and/or step shown in the flowcharts or described herein in another way, such as a sequence list of executable instructions which can be considered for achieving logic functions, can be achieved in any computer-readable media, for use by an instruction executing system, device or apparatus (such as a computer-based system, a system including a processor, or other systems which can obtain and execute instructions from an instruction executing system, device or apparatus), or for use in combination with the instruction executing system, device or apparatus. As for the present description, a "computer-readable medium" may be any device which may contain, store, communicate, propagate or transmit a program for use by an instruction executing system, device or apparatus or for use in combination with the instruction executing system, device or apparatus. The more specific examples of the computer-readable media (non-exhaustive list) include the following media: an electrical connection part (electronic device) having one or more wirings, a portable computer disc box (magnetic device), a random access memory (RAM), a read-only memory (ROM), an erasable programmable read-only memory (EPROM or flash memory), an optical fiber device, and a portable compact disc read-only memory (CDROM). In addition, the computer-readable medium even may be a paper or other suitable media printed thereon with a program because the paper or other suitable media may be optically scanned, and then edited, interpreted, or processed in other suitable manners if necessary, to obtain the program in an electronic manner which is then stored in a computer memory.

It should be understood that any portion of the present disclosure can be achieved by hardware, software, firmware or a combination thereof. In the above embodiments, several steps or methods can be achieved by software stored in a memory and performed by an appropriate instruction performing system or by firmware. For example, if they are achieved by hardware, similar to those in another embodiment, they can be achieved by any one or combination of the following technologies known in the art: a discrete logic circuit having a logic gate circuit enabling logic function to a digital signal, an application specific integrated circuit (ASIC) having suitable combined logic gate circuits, a programmable gate array (PGA), a field PGA (FPGA), etc. It is understandable for those skilled in the art that all or some steps provided in the methods of the above embodiments can be achieved by related hardware instructed by a program which can be stored in a computer-readable storage medium. The program, when being performed, includes one or combination of the steps of the method embodiments. In addition, various function units in various embodiments of the present disclosure may be integrated into one processing module, or the various units may be individual physical entities, or two or more units may be integrated into one module. The above integrated module may be achieved in a form of hardware, or may be achieved in a form of software function module. The integrated module, when achieved in a form of software function module and sold or used as an individual product, may also be stored in a computer-readable storage medium. The above mentioned storage medium may be a read-only memory, a disk, or a CD, etc.

The above are only preferred embodiments of the present disclosure, and are not used to limit the present disclosure. For those skilled in the art, there may be various modifications and variations in the present disclosure. Any modification, equivalent substitution or improvement made within the spirit and principle of the present disclosure will be covered by the protection scope of the present disclosure.

What is claimed is:

1. A turning control method for a construction machine, comprising:
   acquiring position information of an initial position and a target position as well as kinematic parameters of the construction machine;
   determining a turning curve according to the position information and the kinematic parameters; and
   controlling the construction machine to travel from the initial position to the target position according to the turning curve,
   wherein the kinematic parameters comprise a minimum turning radius of the construction machine, a turning travel speed of the construction machine, and a switching time period for the construction machine to switch from a state of traveling straight to a state of turning with the minimum turning radius; and a portion of the turning curve in which curvature thereof varies is a transition curve;
   wherein the determining a turning curve according to the position information and the kinematic parameters comprises:
   determining a first angle and a first distance between the target position and an extension line of the initial position according to the position information;
   generating a curve model according to the minimum turning radius, the turning travel speed and the switching time period;
   determining a curve type of the turning curve according to the first distance; and
   determining the turning curve according to the first angle, the curve type and the curve model,
   wherein the first angle is a supplementary angle to a turning angle of the construction machine, the curve type is determined from various curve types according to whether it is necessary for the construction machine to travel straight, and the curve model is used for calculating the turning curve for the construction machine to travel from the initial position to the target position;
   wherein the determining a curve type of the turning curve according to the first distance comprises:
   judging whether the first distance is less than or equal to a distance threshold, and generating a first judgment result;
   if the first judgment result is yes, determining that the curve type is a first type; and
   if the first judgment result is no, determining that the curve type is a second type,
   wherein in a case that the curve type is the first type, the turning curve is used for controlling the construction machine to achieve traveling from the initial position to the target position by turning, and in a case that the curve type is the second type, the turning curve is used for controlling the construction machine to achieve traveling from the initial position to the target position by multiple times of turning and traveling straight;
   wherein in a case that the curve type is the first type, the determining the turning curve according to the first angle, the curve type and the curve model comprises:
   determining an angle range where the first angle is located;
   if $0° <$ the first angle $\leq$ a first angle threshold, determining a transition point according to the first angle, and determining the turning curve according to the transition point, the initial position, the target position and the curve model;
   if the first angle threshold $<$ the first angle $\leq$ a second angle threshold, determining the turning curve according to the curve model;
   if the second angle threshold $<$ the first angle $\leq$ a third angle threshold, determining the turning curve according to the curve model after angle transformation; and
   if the third angle threshold $<$ the first angle $\leq 180°$, determining a backward turning angle according to the first angle and the first distance, and determining the turning curve according to the backward turning angle and the curve model,
   wherein the first angle threshold and the third angle threshold are preset values, the second angle threshold is two times of a complementary angle to a tangential deviation angle of the transition curve, the backward turning angle is an angle by which the construction machine travels backward from the initial position and turns until a vehicle axis of the construction machine is coaxial with that of the construction machine at the target position.

2. The turning control method according to claim 1, wherein in a case that the curve type is the second type, the determining the turning curve according to the first angle, the curve type and the curve model comprises:
   determining a first turning point and a second turning point according to the initial position and the target position;
   determining a connection straight line passing through the first point and the second turning point;
   determining a first turning curve according to the first angle, the initial position, the first turning point and the curve model;
   determining a second turning curve according to the first angle, the second turning point, the target position and the curve model; and
   determining the turning curve according to the connection straight line, the first turning curve and the second turning curve,
   wherein the first turning point is an ending position of a path along which the construction machine turns from the initial position onto the connection straight line, and the second turning point is a starting position of a path along which the construction machine turns from the connection straight line to the target position.

3. The turning control method according to claim 2, wherein the determining a first turning curve according to the first angle, the initial position, the first turning point and the curve model comprises:
   determining a vehicle axis of the construction machine at the initial position as a first straight line;
   determining a first included angle between the first straight line and the connection straight line; and
   determining the first turning curve according to the first included angle and the curve model.

4. The turning control method according to claim 2, wherein the determining a second turning curve according to the first angle, the second turning point, the target position and the curve model comprises:
   determining a vehicle axis of the construction machine at the target position as a second straight line;
   determining a second included angle between the second straight line and the connection straight line; and
   determining the second turning curve according to the second included angle and the curve model.

5. The turning control method according to claim 1, wherein the transition curve is defined based on the following equations:

$r \times l = R \times L$; and $L = V \times t$, wherein r is an instantaneous turning radius, l is a length of a transition curve corresponding to the instantaneous turning radius, R is the minimum turning radius, L is a length of the transition curve, V is the turning travel speed, and t is the switching time period.

6. The turning control method according to claim 1, wherein the construction machine is a road construction machine.

7. A computer device, comprising:
a processor; and,
a memory, configured to store a computer program which when executed by the processor causes the processor to perform the turning control method for a construction machine according to claim 1.

8. A construction machine, comprising:
a vehicle body;
a detection assembly, connected with the vehicle body and configured to detect position information of the vehicle body; and
a controller, provided in the vehicle body, the controller being electrically connected with the vehicle body and the detection assembly to control traveling of the vehicle body according to the position information detected by the detection assembly,
wherein the controller is configured to control turning of the vehicle body according to the following steps:
acquiring position information of an initial position and a target position as well as kinematic parameters of the construction machine;
determining a turning curve according to the position information and the kinematic parameters; and
controlling the construction machine to travel from the initial position to the target position according to the turning curve,
wherein the kinematic parameters comprise a minimum turning radius of the construction machine, a turning travel speed of the construction machine, and a switching time period for the construction machine to switch from a state of traveling straight to a state of turning with the minimum turning radius; and a portion of the turning curve in which curvature thereof varies is a transition curve;
wherein the determining a turning curve according to the position information and the kinematic parameters comprises:
determining a first angle and a first distance between the target position and an extension line of the initial position according to the position information;
generating a curve model according to the minimum turning radius, the turning travel speed and the switching time period;
determining a curve type of the turning curve according to the first distance; and
determining the turning curve according to the first angle, the curve type and the curve model,
wherein the first angle is a supplementary angle to a turning angle of the construction machine, the curve type is determined from various types according to whether it is necessary for the construction machine to travel straight, and the curve model is used for calculating the turning curve for the construction machine to travel from the initial position to the target position;
wherein the determining a curve type of the turning curve according to the first distance specifically comprises:

judging whether the first distance is less than or equal to a distance threshold and generating a first judgment result;
if the first judgment result is yes, determining that the curve type is a first type; and
if the first judgment result is no, determining that the curve type is a second type,
wherein in a case that the curve type is the first type, the turning curve is used for controlling the construction machine to achieve traveling from the initial position to the target position by turning, and in a case that the curve type is the second type, the turning curve is used for controlling the construction machine to achieve traveling from the initial position to the target position by multiple times of turning and traveling straight;
wherein in a case that the curve type is the first type, the determining the turning curve according to the first angle, the curve type and the curve model comprises:
determining an angle range where the first angle is located;
if $0° <$ the first angle$\leq$ a first angle threshold, determining a transition point according to the first angle, and determining the turning curve according to the transition point, the initial position, the target position and the curve model;
if the first angle threshold$<$the first angle$\leq$a second angle threshold, determining the turning curve according to the curve model;
if the second angle threshold$<$the first angle$\leq$a third angle threshold, determining the turning curve according to the curve model after angle transformation; and
if the third angle threshold$<$the first angle$\leq 180°$, determining a backward turning angle according to the first angle and the first distance, and determining the turning curve according to the backward turning angle and the curve model,
wherein the first angle threshold and the third angle threshold are preset values, the second angle threshold is two times of a complementary angle to a tangential deviation angle of the transition curve, the backward turning angle is an angle by which the construction machine travels backward from the initial position and turns until a vehicle axis of the construction machine is coaxial with that of the construction machine at the target position.

9. The construction machine according to claim 8, wherein in a case that the curve type is the second type, the determining the turning curve according to the first angle, the curve type and the curve model comprises:
determining a first turning point and a second turning point according to the initial position and the target position;
determining a connection straight line passing through the first and second turning points;
determining a first turning curve according to the first angle, the initial position, the first turning point and the curve model;
determining a second turning curve according to the first angle, the second turning point, the target position and the curve model; and
determining the turning curve according to the connection straight line, the first turning curve and the second turning curve,
wherein the first turning point is an ending position of a path along which the construction machine turns from the initial position onto the connection straight line, and the second turning point is a starting position of a path along which the construction machine turns from the connection straight line to the target position.

10. The construction machine according to claim 9, wherein the determining a first turning curve according to the first angle, the initial position, the first turning point and the curve model comprises:
   determining a vehicle axis of the construction machine at the initial position as a first straight line;
   determining a first included angle between the first straight line and the connection straight line; and
   determining the first turning curve according to the first included angle and the curve model.

11. The construction machine according to claim 9, wherein the determining a second turning curve according to the first angle, the second turning point, the target position and the curve model comprises:
   determining a vehicle axis of the construction machine at the target position as a second straight line;
   determining a second included angle between the second straight line and the connection straight line; and
   determining the second turning curve according to the second included angle and the curve model.

12. The construction machine according to claim 8, wherein the transition curve is defined based on the following equations:

$$r \times l = R \times L;\text{ and}$$

$$L = V \times t,$$

wherein r is an instantaneous turning radius, l is a length of the transition curve corresponding to the instantaneous turning radius, R is the minimum turning radius, L is a length of the transition curve, V is the turning travel speed, and t is the switching time period.

13. The construction machine according to claim 8, wherein the construction machine is a road construction machine.

14. The construction machine according to claim 8, wherein the construction machine is an unmanned construction machine.

* * * * *